United States Patent [19]

Shimotake et al.

[11] 4,006,034
[45] Feb. 1, 1977

[54] METHOD OF PREPARING AN ELECTROCHEMICAL CELL IN UNCHARGED STATE

[75] Inventors: Hiroshi Shimotake, Hinsdale; Louis G. Bartholme, Joliet; John D. Arntzen, Naperville, all of Ill.

[73] Assignee: The United States of America as represented by the United States Energy Research and Development Administration, Washington, D.C.

[22] Filed: Mar. 11, 1976

[21] Appl. No.: 665,746

[52] U.S. Cl. .............................. 29/623.1; 29/623.5; 429/218; 429/220; 429/221

[51] Int. Cl.[2] ......................................... H01M 4/36

[58] Field of Search ......... 136/20, 76, 120 R, 6 LF, 136/25, 34

[56] References Cited

UNITED STATES PATENTS 3,881,951  5/1975  McCoy ..................... 136/120 R X

Primary Examiner—Anthony Skapars
Assistant Examiner—C. F. LeFevour
Attorney, Agent, or Firm—Dean E. Carlson; Arthur A. Churm; Hugh W. Glenn

[57] ABSTRACT

A secondary electrochemical cell is assembled in an uncharged state for the preparation of a lithium alloy-transition metal sulfide cell. The negative electrode includes a material such as aluminum or silicon for alloying with lithium as the cell is charged. The positive electrode is prepared by blending particulate lithium sulfide, transition metal powder and electrolytic salt in solid phase. The mixture is simultaneously heated to a temperature in excess of the melting point of the electrolyte and pressed onto an electrically conductive substrate to form a plaque. The plaque is assembled as a positive electrode within the cell. During the first charge cycle lithium alloy is formed within the negative electrode and transition metal sulfide such as iron sulfide is produced within the positive electrode.

13 Claims, 2 Drawing Figures

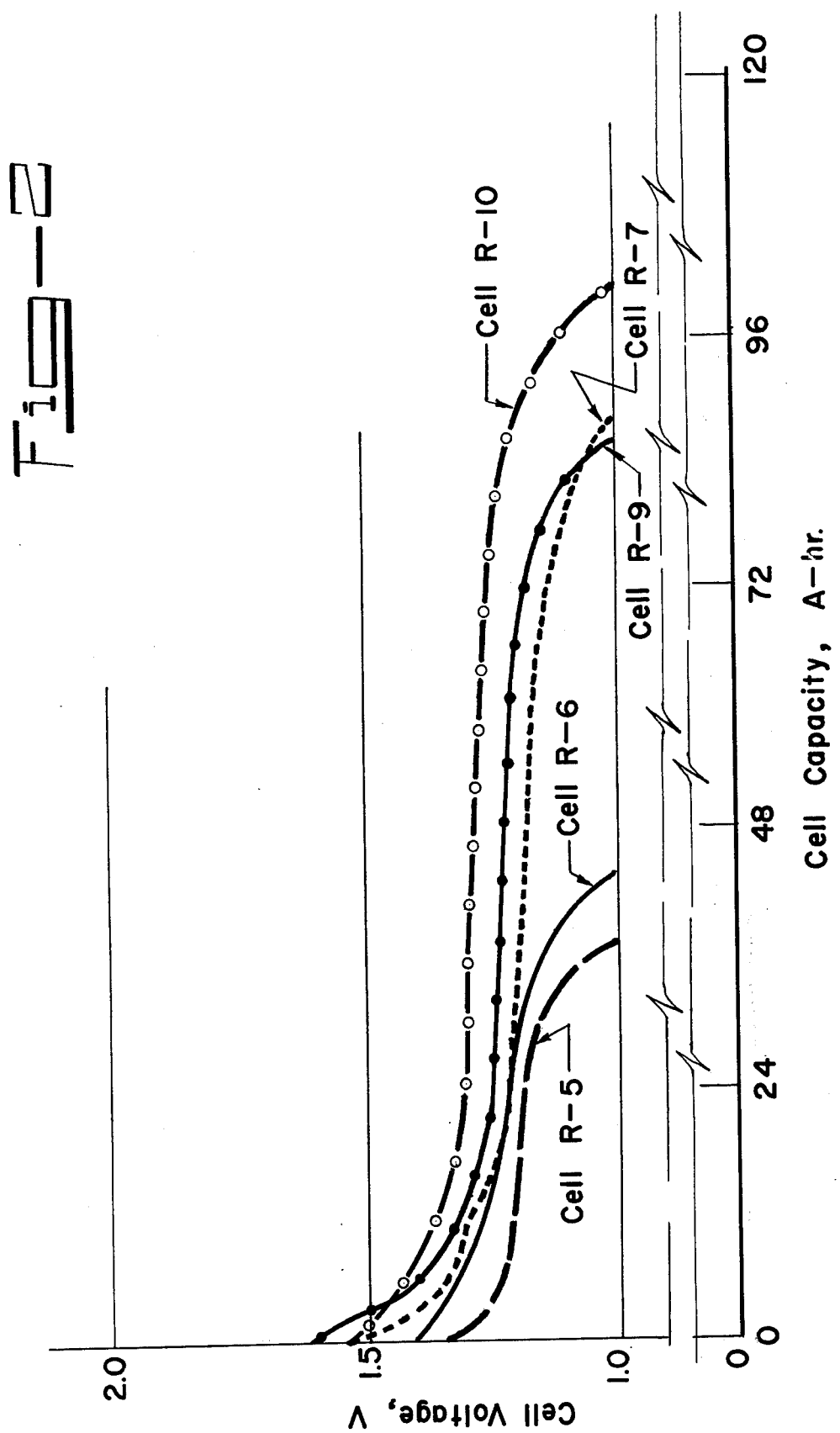

METHOD OF PREPARING AN ELECTROCHEMICAL CELL IN UNCHARGED STATE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to high-temperature, secondary electrochemical cells and batteries of such cells that can be employed as power sources for electric automobiles, storage of energy generated during intervals of off-peak power consumption and various other applications. It is particuarly applicable to electrochemical cells that employ metal sulfides as positive electrode active materials and lithium alloys such as lithium-aluminum or lithium-silicon as the negative electrode active material.

A substantial amount of work has been done in development of these types of electrochemical cells and their electrodes. Examples of such high-temperature cells and their various components are disclosed in U.S. Pat. No. 3,887,396 to Walsh et al., entitled "Modular Electrochemical Cell", June 3, 1975; U.S. Pat. No. 3,907,589 to Gay and Martino, entitled "Cathodes for a Secondary Electrochemical Cell", Sept. 23, 1975; U.S. Pat. No. 3,933,520 to Gay and Martino entitled "Method of Preparing Electrodes with Porous Current Collector Structures and Solid Reactants for Secondary Electrochemical Cells", Jan. 20, 1976; and allowed U.S. Pat. No. 3,941,612 Mar. 2, 1976 to Steunenberg et al., entitled "Improved Cathode Composition for Electrochemical Cell". The method of the present application is in particular an improvement to that disclosed in allowed U.S. Pat. No. 3,947,291 Mar. 30, 1976 to Yao and Walsh, entitled "Electrochemical Cell Assembled in Discharged State", filed Sept. 30, 1974. Each of these patents and patent applications is assigned to the assignee of the present application.

Previous methods for preparing electrochemical cells in uncharged state have been limited in the cell capacity that can be provided in small and light-weight cells. In these earlier procedures, lithium sulfide and an electrolytic salt such as lithium chloride-potassium chloride eutectic were repetitively ground and heated to a temperature in excess of the melting point of the electrolyte to produce a powdered mass of finely divided lithium sulfide particles coated and wetted with electrolyte. The amount of lithium sulfide that could be included within this electrode material was limited by the consistency of the mixture which became increasingly viscous with lithium sulfide content.

The electrode material thus prepared is pressed into the openings within a layer or a stack of iron transition metal mesh to form the positive electrode. On charging of this cell, the iron or other transition metal within the mesh corrodes and reacts with the lithium sulfide to form a metallic sulfide such as FeS which serves as the positive electrode reactant. This type system requires not only the corrosion but the diffusion of the iron through the electrode material in order to obtain a uniform composition. Positive electrodes prepared by this procedure have been found to have low initial capacities and require several break-in cycles. In addition, only thin electrodes prepared in this manner have performed well, thus making the preparation of high-capacity cells difficult or impractical. The use of thin electrodes with large areas in cells having practical quantities of active material for commercial cells can result in nonuniform current distribution and high diffusional polarization.

Therefore, in view of these shortcomings in prior art methods, it is an object of the present invention to provide a method of preparing an electrochemical cell in uncharged state with increased capacity.

It is a further object to provide a simplified method for preparing a positive electrode in uncharged state with minimum grinding and heating steps.

It is also an object to provide a method of preparing a positive electrode in uncharged state that will exhibit near maximum capacity in early cycles.

SUMMARY OF THE INVENTION

In accordance with the present invention, a method is provided for preparing a positive electrode for use in a secondary electrochemical cell opposite to a negative electrode containing a material for alloying with lithium. The positive electrode is prepared by blending particulate lithium sulfide, a particulate metal such as iron, nickel, cobalt or copper and particles of an electrolytic salt of an alkali metal or alkaline earth metal halide. This solid mixture is formed at a temperature below the melting point of the electrolytic salt to prevent formation of a thick paste which may be difficult to blend to uniformity. The solid particulate mixture is then pressed onto an electrically conductive substrate while simultaneously heating to a temperature in excess of the melting point of the electrolytic salt. The plaque as thus formed on the electrically conductive substrate is assembled as the positive electrode within an electrochemical cell opposite to a negative electrode that includes a material for alloying with lithium. The cell is then electrically charged to produce a transition metal sulfide within the positive electrode and a lithium alloy of such as lithium-aluminum or lithium-silicon within the negative electrode.

In more specific aspects of the invention, the transition metal powder within the positive electrode mixture can comprise by weight a major portion of iron and a minor portion of copper for the formation of FeS and copper sulfides on electrochemically charging. In one other procedure a minor portion by weight of cobalt can be combined with a major portion of iron to provide $FeS_2$ and cobalt sulfides.

BRIEF DESCRIPTION OF THE DRAWING

The present invention is illustrated in the accompanying drawings wherein:

FIG. 2 is a graph showing cell capacity v voltage for several cells prepared in accordance with the present invention.

DETAILED DESCRIPTION OF THE PREFERRED EMBODIMENT

Figure 1:
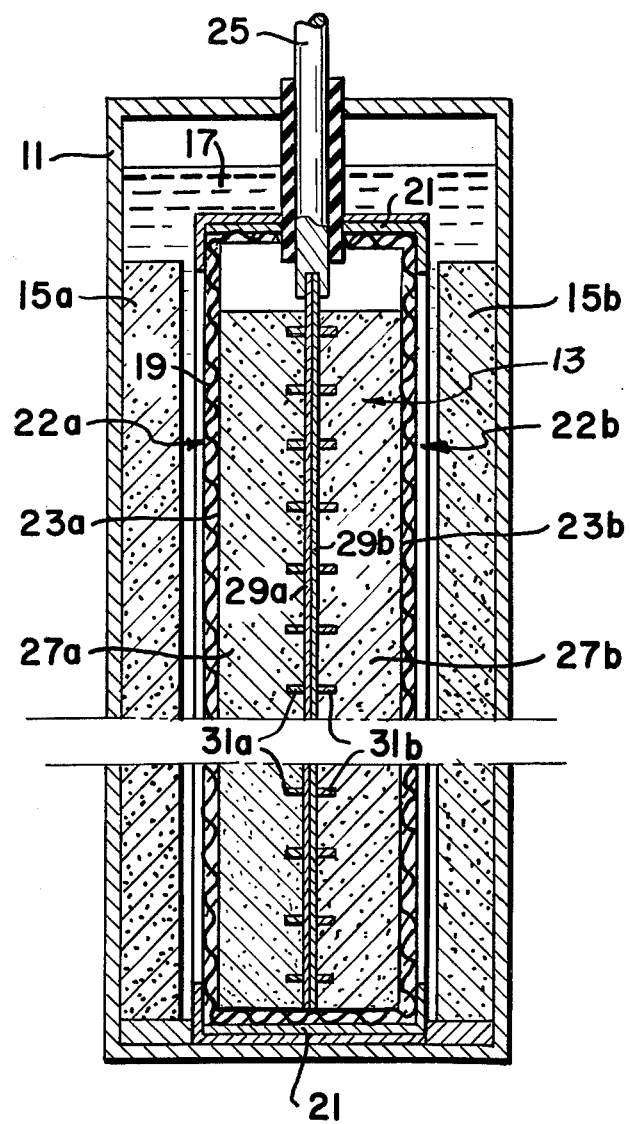
FIg. 1 is a cross-sectional elevation view of an electrochemical cell.

In the figure, an electrochemical cell is shown with vertically arranged electrodes. The cell is contained within an outer housing 11 containing a centrally located positive electorde 13 between two negative electrodes 15a and 15b. The housing is filled except for space for expansion with liquid electrolyte 17 that permeates a porous electrically insulative fabric 19 between the positive and negative electrodes.

Fabric 19 is held in place by two interlocking frames 21 disposed around the positive electrode 13. Each of the frames 21 are like picture frames in that they circumscribe large, side openings 22a and 22b for exposing the major surfaces 23a and 23b of the positive electrode. The circumscribed side openings can be covered with screen or cloth (not shown) to insure retention of the positive electrode active material.

Electrical contact for the cell is made to the positive electrode through conductor 25 which insulatively penetrates housing 11 and the interlocking frames 21. Electrical connections to the negative electrodes are made by suitable connections to housing 11.

Negative electrodes 15a and 15b can be provided in a number of forms and by a number of methods. These electrodes can comprise pressed aluminum wires, fibers or particles that contain a stainless steel grid or screen to enhance current collection. As an alternate technique, aluminum or silicon particles can be vibratorily loaded into a metallic foam of nickel or stainless steel as is described in U.S. Pat. No. 3,933,520, as cited above. Other negative electrode types can be provided by immersing porous or foamed metal substrates into a melt of aluminum or lithium-aluminum alloy as is described in copending U.S. patent application Ser. No. 639,133, filed Dec. 9, 1975 by Tomczuk et al., entitled "A Method of Preparing a Negative Electrode Including Lithium Alloy for Use within a Secondary Electrochemical Cell". These and other techniques are used to provide the negative electrodes 15a and 15b in the unchanged or partially uncharged state. These negative electrodes are porous masses containing aluminum or silicon or other material suitable for alloying with lithium to form a solid negative electrode active material at the cell operating temperature.

The electrolyte 17 can be of various ion-containing materials, but for high-temperature high-power electrochemical cells, eutectic and other salt compositions that are molten at the cell operating temperatures are employed. For such cells, temperatures of 375° to about 500° C. are customarily used. Electrolytic salt compositions of LiCl-KCl or LiCl-LiF-KBr along with various other suitable electrolytes such as those listed in U.S. Pat. No. 3,488,221 have been found to be suitable.

The positive electrode as shown in the figure includes two porous plaques 27a and 27b containing the electrode material, electrolyte and possibly additional current-collecting material. The center of electrode 13 as shown includes two back-to-back, electrically conductive plates 29a and 29b. Each plate includes laterally extending ridges or shelves 31a and 31b of, for instance, metallic mesh for supporting electrode material.

In practice, various other cell and electrode designs may be used with electrodes produced by the improved method of the present invention. The cell of the figure merely represents an example of the type cell that has been used experimentally to test and prove the operability of such electrodes.

In preparing the positive electrode, the electrode material is selected in its uncharged state. For example, in a cell employing lithium as lithium alloy and ferrous sulfide as the negative and positive electrode materials, respectively, the cell reaction is as follows.

$$2\,LiAl_x + FeS \rightarrow Li_2S + Fe + 2\,Al_x$$

In this instance, the electrode materials to be included in the positive electrode in uncharged state are Fe and $Li_2S$. Aluminum, as explained above, is included in the negative electrode. The positive electrode material along with the electrolytic salt is provided in powdered or particulate form. These materials are blended into a solid mixture at a temperature below the melting point of the salt. The amount of electrolyte can vary between 20 to 35 weight percent, preferably 25–30 weight percent of the total mixture. An amount less than 20 weight percent tends to produce a fragile plaque while amounts in excess of 35 weight percent may be lost during hot pressing.

Other transition metal powders such as nickel, cobalt or copper can be included, either alone or in combination with iron or each other, within the uncharged positive electrode composition. In the usual composition, the total amount of transition metal, e.g. Fe, Ni, Cu, Co, etc., is sufficient to stoichiometrically balance and react with the included $Li_2S$. However, as described below, in some instances $Li_2S$ may be included in excess.

In some instances, lithium compounds other than lithium sulfide can be included, for example, lithium carbide, lithium nitride, or lithium hydride so as to provide excess capacity in the form of lithium alloy within the negative electrode on charging the cell. The additives are preferably added in an amount sufficient to provide an excess of 5 to 25 atom percent lithium over that in $Li_2S$. Of these type additives, $Li_2C_2$ is preferred because on electrically charging it produces carbon particles within the positive electrode. These carbon particles will be electrically conductive and serve as current collector materials.

Other additives can also be employed to effect excess capacity within the negative electrodes. For example, a stoichiometric excess of $Li_2S$ over transition metal powder can be included within the initial mixture of uncharged electrode materials. On electrochemical charging, free sulfur may be produced within the positive electrodes and iron structural materials may corrode to generate additional $FeS_2$ or $FeS$. On the other hand, the sulfur may vaporize or otherwise be lost to leave excess capacity within the negative electrodes.

Compounds including other alkali metals than lithium or alkaline earth metals can also be incorporated into the mixture of positive electrode materials. As examples, the carbides, hydrides and nitrides of sodium, potassium, magnesium and calcium can be included in amounts that would provide one of these metals in about 5 to 25 atom percent in combination with the lithium of the cell. On electrocharging, solid alloys, at the cell operating temperature, of these additives and such as aluminum can be formed in the negative electrode to provide the desired additional electrochemcial capacity.

The particulate mixture of transition metals, lithium sulfide, electrolyte and additives where included is applied to a backing or substrate such as one of the two current collector plates 29a and 29b illustrated in FIG. 1. The mixture and plate are pressed at a suitably high pressure, e.g. 2–3 MPa (290–440 psig) while simultaneously heating to a temperature in excess of the melting point of the electrolyte so as to form an integral plaque of the electrode material. A second plaque can be similarly formed and the two welded or otherwise fabricated together in order to form the positive electrode illustrated in FIG. 1.

The positive electrode is assembled within the electrochemical cell along with negative electrodes containing a material such as aluminum or silicon for alloying with lithium and any other alkali metal or alkaline earth metal additive. The cell with added electrolyte is electrically charged to produce a transition metal sulfide such as ferrous sulfide within the positive electrode and a lithium alloy such as lithium-aluminum within the negative electrode. The initial and subsequent charges during cell operation are at sufficiently low voltages to prevent formation of free sulfur or metal sulfides of higher potential. In the case of the FeS positive electrode, charge voltages of less than about 1.8 V are used to prevent $FeS_2$ formation with accompanying corrosion of iron current collector and structural components. This is of particular importance where excess $Li_2S$ over iron powder is included in the initial positive electrode composition. Where additives such as lithium carbide are within the initial composition and are electrochemically charged to lithium-aluminum alloy in the negative and carbon particles within the positive electrode, discharge voltages are maintained at a sufficiently high level, e.g. above 0.8 V for lithium carbide, to prevent reformation of the additive.

The following examples are presented to more clearly illustrate the method of the present invention.

EXAMPLE I (Cell R-7)

A solid particulate mixture containing 104 g $Li_2S$, 101 g Fe powder, 57 g Cu powder, 112 g LiCl-KCl eutectic were blended at ambient temperature and ground to pass 351 micrometers openings (−42 mesh). The mixture was divided into two parts and each part poured into a die containing an iron backing sheet covered with an attached iron mesh with about 1 cm openings. The die was heated to 360° C. which is above the melting point of the electrolytic salt and the mixture was pressed at approximately 2.8 MPa (400 psig) for 10 minutes while maintaining that temperature. The resulting plaques that were formed were spot welded together at the backing sheets and encased within layers of zirconia and boron nitride cloth. The boron nitride cloth was prewetted with a methyl alcohol solution of LiCl-KCl electrolyte. The assembled plaques were then equipped with an electrode terminal and enclosed within an interlocking frame assembly similar to that illustrated in FIG. 1 at 21.

The negative electrodes were prepared by placing a stainless steel screen between layers of aluminum wire and compacting at about 6.9 MPa (10,000 psig) and 200° C. The cell was assembled in a configuration similar to that shown in the figure and operated for an extended period of time. One significant improvement shown in the performance of this and other cells prepared in accordance with the present invention over previous cells was in the high utilization of active material (75–85%) in the initial and early operating cycles. Other characteristics of the cell R-7 are shown in Table I along with data for cells R-5 and R-6, prepared in similar manner.

TABLE I

| Cell No. | R-5 | R-6 | R-7 |
|---|---|---|---|
| Positive Electrode | | | |
| Active Material | $Li_2S$-Fe | $Li_2S$-Fe | $Li_2S$-Fe |
| Additive Material | None | 10 w/o Cu | 20 w/o Cu |
| Electrode Area, cm$^2$ | 278 | 278 | 278 |
| Theo. Capacity, A-hr | 69.2 | 56.3 | 105 |
| Current Collector | Iron sheet | Iron sheet | Iron sheet |
| Initial Thickness, cm | 0.95 | 0.68 | 1.08 |
| Negative Electrode | | | |
| Material | Al | Al | Al |
| Electrode Area, cm$^2$ | 320 | 320 | 320 |
| Theo. Capacity, A-hr | 69.2 | 56.3 | 105 |
| Current Collector | Al wire-SS strap | SS screen | SS screen |
| Initial Thickness, cm | 0.4/plaque | 0.4/plaque | 0.26/plaque |
| Test Results | | | |
| Charge Cutoff Voltage (IR-free), V | 1.65 V | 1.65 | 1.65 |
| Discharge Cutoff Voltage (IR-free), V | 1.0 | 1.0 | 1.0 |
| Discharge Current, A | 4 | 5 | 5 |
| Capacity A-hr | 53.66 | 44 | 86 |
| Utilization, % | 77.5 | 78 | 71 |
| Cell Temp., ° C. | 450 | 450 | 450 |
| Charge Current, A | 4 | 5 | 5 |
| Ah Efficiency, % | 99.5 | 93 | 98 |
| Wh Efficiency, % | 73.2 | 80 | 85 |
| Cell Resistance, M | 60 | 4 | 4 |
| Cell Life | | | |
| Test Duration, hr | >3500 | >3000 | >2500 |
| Number of Cycles | >250 | >200 | >150 |

EXAMPLE II

A positive electrode is prepared in the manner described in Example I except that cobalt power is substituted for copper and on electrochemically charging $FeS_2$ with sulfides of cobalt are formed in the positive electrode.

Two cells in which additives were included within the positive electrode composition to provide additional capacity are present in Examples III and IV with further descriptive data shown in Table II. Cell capacity v voltage at 10 A discharge current is shown in FIG. 2 for these cells as well as for those described in Example I.

EXAMPLE III (Cell R-9)

In one other similar electrochemical cell, the uncharged positive electrode mixture included 94 g Fe powder, 53 g Cu powder, 105 g solid particulate LiCl-KCl eutectic and 107 g lithium sulfide. The amount of lithium sulfide is about 10 g more than that required to combine with all of the powdered iron and copper to produce FeS and CuS. As is shown in FIG. 2, this cell performed at about the same capacity as cell R-7 of Example I but with less positive electrode material.

EXAMPLE IV (Cell R-10)

An electrochemical cell similar to that described in Example I was prepared except that the uncharged positive electrode composition included about 112 g $Li_2S$, 26 g $Li_2C_2$, 108 g Fe powder, 62 g Cu powder and 118 g LiCl-KCl. The cell operation at 10 A discharge showed a very high cell capacity of about 100 A-Hrs at 1 V cutoff which was about 15% greater than that obtained in cell R-7 of Example I.

TABLE II

| Type of Cell | R-9 | R-10 |
|---|---|---|
| Positive Electrode | | |
| Active Material | $Li_2S$ + Fe | $Li_2S$ + Fe |
| Additives | $Li_2S$ + Cu | $Li_2C_2$ + Cu |
| Electrode Area, $cm^2$ | 297 | 297 |
| Theo. Capacity, A-hr | 97 | 131 |
| Current Collector | Iron sheet | Iron sheet |
| Initial Thickness, cm | 1.27 | 1.37 |
| Negative Electrode | | |
| Material | Al | Al |
| Electrode Area, $cm^2$ | 323 | 323 |
| Theo. Capacity, A-hr | 97 | 150 |
| Current Collector | Al wire-SS screen | Al wire-SS screen |
| Initial Thickness, cm | 0.56 | 0.87 |
| Test Results | | |
| Charge Cutoff Voltage (IR-free), V | 1.65 | 1.65 |
| Discharge Cutoff Voltage (IR-free), V | 1.0 | 1.0 |
| Discharge Current, A | 5 10 20 30 | 5 10 20 30 |
| Capacity, A-hr | 83 86 77 68 | 101 98 91 81 |
| Utilization, % | 86 89 79 70 | 67 65 61 53 |
| Cell Temp, °C. | 450 | 450 |
| Charge Current, A | 5 | 10 |
| Ah Efficiency, % | 95 | 80–90 |
| Wh Efficiency, % | 85 | 82 |
| Cell Resistance, M | 4 | 10 |
| Cell Life | | |
| Test Duration, hr | 368 | 480 |
| Number of Cycles | 7 | 15 |

It can be seen from the above examples and description that the present invention provides an improved method for preparing a positive electrode. The method permits including sufficient amounts of active material with the positive electrode composition to provide high A-Hr capacities at good utilization efficiencies. Such high-capacity loading can be accomplished without the repetitive grinding and heating steps of prior art methods. Positive electrode thicknesses of one-half of one cm are provided with the method while cell performance exhibits good utilization of the active material. In addition, the cells exhibit high utilization in the initial and early cycles in contrast to prior cells assembled in the uncharged state that often required a break-in period of several cycles.

The embodiments of the invention in which an exclusive property or privilege is claimed are defined as follows:

1. A method of preparing a positive electrode for use in a secondary electrochemical cell opposite to a negative electrode containing an element for alloying with lithium comprising blending particulate lithium sulfide, transition metal and electrolytic salt of alkali metal halides or alkaline earth metal halides at a temperature below the melting point of the electrolytic salt to form a solid mixture; heating said solid mixture to a temperature in excess of the melting point of said electrolytic salt while simultaneously pressing said mixture onto an electrically conductive substrate to form a plaque; and assembling said plaque as a positive electrode within said electrochemical cell opposite to said negative electrode and electrically charging said cell to produce a transition metal sulfide in said positive electrode and a lithium alloy within said negative electrode.

2. The method of claim 1 wherein said lithium sulfide transition metal and electrolytic salt are comminuted to about 350 micrometers particle size.

3. The method of claim 1 wherein iron and copper powder is included within said solid mixture and FeS with sulfides of copper are produced within said positive electrode during said electrical charging.

4. The method of claim 1 wherein iron and cobalt powder is included within said solid mixture and $FeS_2$ with sulfides of cobalt are produced during the electrical charging of said cell.

5. The method of claim 1 wherein said solid mixture includes a eutectic composition of LiCl-KCl as electrolytic salt and is heated to 350° to 400° C. and maintained for about 10 minutes while pressing.

6. The method of claim 1 wherein said mixture is pressed within a die onto an electrically conductive substrate at about 2 to 3 MPa while heating in excess of the melting point of said electrolytic salt.

7. The method of claim 1 wherein two plaques are formed and bonded together for assembly as said positive electrode.

8. The method of claim 1 wherein said electrically conductive substrate on which said mixture is pressed comprises an iron grid and sufficient iron powder being included within said mixture to combine with all of the included sulfur and said electrochemical cell being operated at cutoff voltages sufficiently low to prevent production of $FeS_2$.

9. The method of claim 1 wherein lithium sulfide is provided in sufficient amount to be in stoichiometric excess to that required to combine with all of said transition metal powder as a monosulfide.

10. The method of claim 1 wherein $Li_2C_2$ is included within said mixture.

11. The method of claim 10 wherein said $Li_2C_2$ is included in an amount of about 5 to 25 mole percent in combination with said $Li_2S$.

12. The method of claim 10 wherein said electrochemical cell is operated at discharge cutoff voltages sufficiently high to prevent formation of $Li_2C_2$ on discharge.

13. The method of claim 10 wherein said electrochemical cell is initially charged to convert substantially all of said lithium carbide and lithium sulfide to lithium alloy, iron sulfides and carbon powder.

* * * * *